United States Patent
Guo

(10) Patent No.: US 9,713,058 B2
(45) Date of Patent: Jul. 18, 2017

(54) METHOD AND SYSTEM FOR ACHIEVING DEVICE-TO-DEVICE COMMUNICATIONS

(71) Applicant: ZTE CORPORATION, Shenzhen, Guangdong Province (CN)

(72) Inventor: Shengxiang Guo, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 14/892,205

(22) PCT Filed: Aug. 16, 2013

(86) PCT No.: PCT/CN2013/081678
§ 371 (c)(1),
(2) Date: Nov. 19, 2015

(87) PCT Pub. No.: WO2013/189353
PCT Pub. Date: Dec. 27, 2013

(65) Prior Publication Data
US 2016/0088543 A1 Mar. 24, 2016

(30) Foreign Application Priority Data
May 20, 2013 (CN) .......................... 2013 1 0187950

(51) Int. Cl.
*H04Q 7/00* (2006.01)
*H04W 36/24* (2009.01)
(Continued)

(52) U.S. Cl.
CPC .......... *H04W 36/24* (2013.01); *H04W 4/005* (2013.01); *H04W 72/044* (2013.01);
(Continued)

(58) Field of Classification Search
CPC ... H04W 36/24; H04W 72/044; H04W 4/005; H04W 76/023; H04W 72/082; H04W 76/043
(Continued)

(56) References Cited

U.S. PATENT DOCUMENTS 9,467,930 B2 * 10/2016 Lim ..................... H04W 48/12
2009/0325625 A1 12/2009 Hugl et al.
(Continued)

FOREIGN PATENT DOCUMENTS

CN 102547731 A 7/2012
CN 103002594 A 3/2013
(Continued)

OTHER PUBLICATIONS

U.S. Appl. No. 61/679,627, filed Aug. 3, 2012.*
(Continued)

*Primary Examiner* — Chuong T Ho
(74) *Attorney, Agent, or Firm* — Ling Wu; Stephen Yang; Ling and Yang Intellectual Property

(57) ABSTRACT

A method and system for achieving device-to-device (D2D) communication are disclosed. The method includes: a controlling user side requesting a network side for coordinating current D2D communication resources; the network side determining a new D2D communication resource according to current D2D communication demands and D2D candidate resource information of a controlled user side; and using the new D2D resource to achieve the D2D communication between a controlling user and a controlled user.

16 Claims, 2 Drawing Sheets

(51) Int. Cl.
*H04W 76/02* (2009.01)
*H04W 4/00* (2009.01)
*H04W 72/04* (2009.01)
*H04W 76/04* (2009.01)
*H04W 72/08* (2009.01)

(52) U.S. Cl.
CPC ........ *H04W 76/023* (2013.01); *H04W 72/082* (2013.01); *H04W 76/043* (2013.01)

(58) Field of Classification Search
USPC ........................................ 370/329, 330, 331
See application file for complete search history.

(56) References Cited

U.S. PATENT DOCUMENTS

| | | | |
|---|---|---|---|
| 2011/0258327 A1 | 10/2011 | Phan et al. | |
| 2011/0312331 A1* | 12/2011 | Hakola | H04W 72/085 455/452.2 |
| 2013/0034082 A1 | 2/2013 | Etemad et al. | |
| 2015/0139197 A1* | 5/2015 | He | H04W 24/04 370/336 |
| 2015/0296443 A1* | 10/2015 | Lim | H04W 48/12 370/312 |

FOREIGN PATENT DOCUMENTS

| | | |
|---|---|---|
| WO | 2005053347 A1 | 6/2005 |
| WO | 2011147462 A1 | 12/2011 |

OTHER PUBLICATIONS

RRC Connection Release for MTC Devices; LG Electronics Inc.; 3GPP TSG-RAN WG2 #71; Madrid, Spain, Aug. 23-28, 2010; R2-104562.

* cited by examiner

METHOD AND SYSTEM FOR ACHIEVING DEVICE-TO-DEVICE COMMUNICATIONS

TECHNICAL FIELD

The present document relates to the field of wireless communication technology, and particularly, to a method and system for achieving Device-to-Device (D2D) communication.

BACKGROUND OF THE RELATED ART

The Device-to-Device (D2D) communication is a new-type technology that allows directly performing communication by multiplexing intra-cell resources between terminals under the control of the cellular system. The D2D technology has advantages including improving system spectrum efficiency, reducing battery consumption of the terminal so as to save power of the mobile station, lowering load of the base station of the cellular cell, improving the user fairness of the system, enhancing the quality of network service, consolidating the substructure and providing new services and so on; and it can solve the problem of channel resource shortage of the wireless communication system to a certain degree.

The D2D communication between users may not only occur within the same operator, but also occur between different operators. In either case, there may be certain problems when it is to achieve the D2D communication, for example, how to allocate channel resources occupied by the D2D user communication, and how to coordinate the D2D communication between the operators and so on.

FIG. 1 is a structural diagram of achieving the D2D communication at present, as shown in FIG. 1, users in the D2D communication are a user equipment A (UE-A), a UE-B and a UE-C respectively. The UE-A is controlled by a base station A (S-A), the UE-B is controlled by a base station S-B, and the UE-C is controlled by a base station S-C; wherein, the A, B and C may belong to different operators, or they may belong to the same operator. At present, generally channel resources occupied by the D2D communication are allocated by a base station side of a cell where an initiator is located. However, once the initiator is in channel resource shortage, for example, there are no spare channel resources or no appropriate shared channel resources and so on, the D2D users are normally required to hand over to the cellular network communication from the D2D communication, so that the D2D communication undoubtedly loses the function of relieving the channel resource shortage of the wireless communication system, thereby increasing the burden of the cellular network, and reducing the resource utilization rate of the cellular network.

SUMMARY

The embodiments of the present document provide a method and system for achieving D2D communication, which can ensure that a channel resource shortage of the wireless communication system can be fully relieved through the D2D communication, thereby reducing the burden of the cellular network, and improving the resource utilization rate of the cellular network.

The embodiment of the present document provides a method for achieving device-to-device D2D communication, which comprises: a controlling user side requesting a network side for coordinating current D2D communication resources;

the network side determining a new D2D communication resource according to current D2D communication demand information and D2D candidate resource information of a controlled user side; and using the new D2D communication resource to achieve the D2D communication between a controlling user and a controlled user.

The following is further comprised before the method: a base station of a cell where the controlling user is located at the controlling user side allocating channel resources occupied by the D2D communication, wherein a channel resource shortage exists; and the channel resource shortage comprises: a mutual interference between other users within the cell where the controlling user is located and the controlling user, and/or expense settlement of the controlling user.

The request for coordinating the current D2D communication resources carries demand information for achieving the current D2D communication, comprising: information of the controlled user in the current D2D communication, and traffic and quality of service of the D2D communication.

The D2D candidate resource information at least comprises: a candidate resource that is spare and available for D2D multiplexing;

said determining the new D2D communication resources comprises:

judging whether the D2D candidate resource meets current D2D communication demands, and if the D2D candidate resource meets the current D2D communication demands, determining the D2D candidate resource as the new D2D communication resource.

The method further comprises: if judging that the D2D candidate resource cannot meet the current D2D communication demands, performing handover processing on the current D2D communication in an existing way.

When a number of the D2D candidate resources is two or more than two, the method further comprises:

if judging that there exist a plurality of D2D candidate resources which all meet the current D2D communication demands, selecting an optimal D2D candidate resource therein as the new D2D communication resource.

Before using the new D2D resource to achieve the D2D communication, the method further comprises:

the network side feeding back information of a selected D2D candidate resource meeting the current D2D communication demands to the controlled user side, and informing the controlling user side of the information of the selected D2D candidate resource meeting the current D2D communication demands.

The method further comprises: the network side distributing corresponding initial power to the controlling user side and the controlled user side.

Using the new D2D resource to achieve the D2D communication comprises:

the base station of the cell where the controlling user is located and a base station of a cell where the controlled user is located respectively controlling the controlling user and the controlled user to perform resource handover according to the new D2D communication resource, and handing over to the selected D2D candidate resource to perform D2D communication.

The present document further provides a system for achieving device-to-device D2D communication, which comprises: a controlling user side, a controlled user side and a network side, wherein, the controlling user side is configured to: send a request for coordinating current D2D communication resources to the network side, receive a new D2D communication resource from the network side, and use the new D2D communication resource to achieve the D2D communication;

the network side is configured to: receive the request for coordinating the current D2D communication resources from the controlling user side; receive D2D candidate resource information from the controlled user side; determine a new D2D communication resource according to current D2D communication demand information and the D2D candidate resource information of the controlled user side; and distribute the new D2D communication resource determined to the controlling user side and the controlled user side; and the controlled user side is configured to: report the D2D candidate resource information to the network side; receive the new D2D communication resource from the network side, and use the new D2D resource to achieve the D2D communication.

The network side is further configured to: communicate with base stations of cells where D2D communication users belonging to different operators are located respectively, and communicate with a core network to which each base station belongs.

If the controlling user side and the controlled user side respectively belong to different operators, the network side is a device configured separately or is implemented with a core network.

If the controlling user side and the controlled user side belong to a same operator, the network side is a base station with an X2 interface.

The controlling user side at least comprises a controlling user and a base station of a cell where the controlling user is located; the controlled user side at least comprises a controlled user and a base station of a cell where the controlled user is located; wherein, the base station of the cell where the controlling user is located is configured to: allocate channel resources occupied by the D2D communication of the controlling user, when a channel resource shortage exists, send the request for coordinating the current D2D communication resources to the network side; and receive the new D2D communication resource from the network side to distribute to the controlling user;

the controlling user is configured to: use the new D2D communication resource to perform D2D communication with the controlled user;

the network side is configured to: receive the request for coordinating the current D2D communication resources from the base station of the cell where the controlling user is located, and receive the D2D candidate resource information from the base station of the cell where the controlled user is located; judge whether the D2D candidate resource meets current D2D communication demands, and if the D2D candidate resource meets the current D2D communication demands, determine the D2D candidate resource as the new D2D communication resource; and distribute the new D2D communication resource determined to the base station of the cell where the controlling user is located and the base station of the cell where the controlled user is located;

the base station of the cell where the controlled user is located is configured to: feed the D2D candidate resource information back to the network side; and receive the new D2D communication resource from the network side to distribute to the controlled user; and the controlled user is configured to: use the new D2D communication resource to perform D2D communication with the controlling user.

The D2D candidate resource information is fed back in a triggering way or a periodic way.

The network side is further configured to: when judging that the D2D candidate resource does not meet the current D2D communication demands, perform handover processing on the current D2D communication in an existing way.

A number of the controlled users is one or more than one.

When the number of the controlled users is two or more than two, a number of the D2D candidate resources is two or more than two; and when judging that the number of D2D candidate resources meeting the current D2D communication demands is two or more than two, the new D2D communication resource is an optimal D2D candidate resource therein.

In the embodiments of the present document, it includes: a controlling user side requesting a network side for coordinating the current D2D communication resources, the network side determining a new D2D communication resource according to the current D2D communication demands and D2D candidate resource information of a controlled user side; and using the new D2D resource to achieve the D2D communication between a controlling user and a controlled user. In the embodiments of the present document, when a channel resource shortage occurs at the controlling user side, firstly it is to negotiate and use channel resources of the controlled user side to perform D2D communication. Therefore, it ensures that the channel resource shortage of the wireless communication system can be fully relieved through the D2D communication, which avoids the D2D users performing handover between the D2D communication and the cellular network communication as far as possible, thereby reducing the burden of the cellular network, and improving the resource utilization rate of the cellular network.

BRIEF DESCRIPTION OF DRAWINGS

Here, the described accompanying drawings are used to provide an understanding for the embodiments of the present document and constitute a part of the present document. The schematic embodiments and illustrations thereof of the present document are used to explain the present document, but do not constitute an inappropriate limitation on the present document. In the drawings.

PREFERRED EMBODIMENTS OF THE INVENTION

The embodiments of the present document will be described in detail in combination with the accompanying drawings below. It should be understood that the embodiments in the present document and the characteristics in the embodiments can be optionally combined with each other in the condition of no conflict.

A controlling user is a user responsible for cooperating with a base station to implement D2D communication power control and time sequence resource allocation in a D2D communication process; a controlled user is a user accepting the D2D communication power control and time sequence resource allocation of the controlling user. The D2D communication is achieved between the controlling user and the controlled user. Before the controlling user initiates the D2D communication, resources occupied by the D2D communication are from resources of a cell where the controlling user is located.

Figure 1:
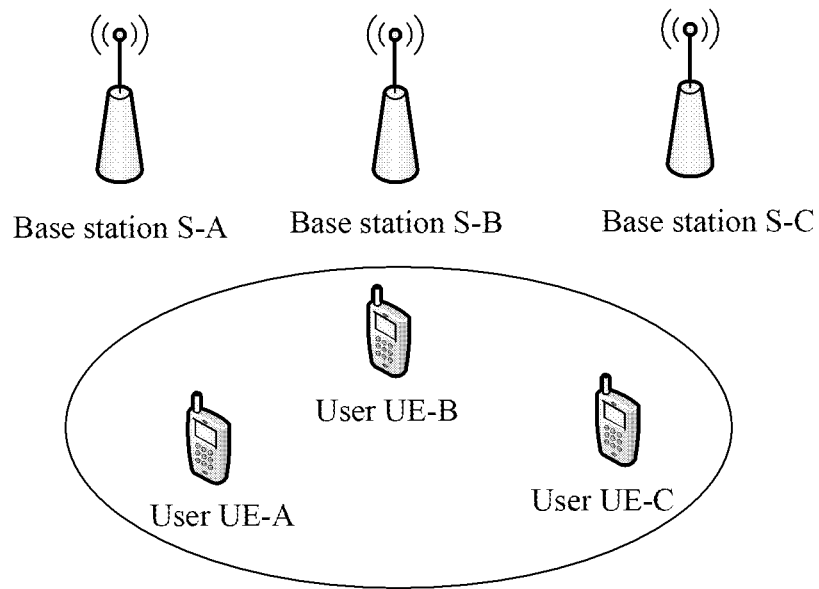
FIG. 1 is a structural diagram of achieving the D2D communication in the related art.
Figure 2:
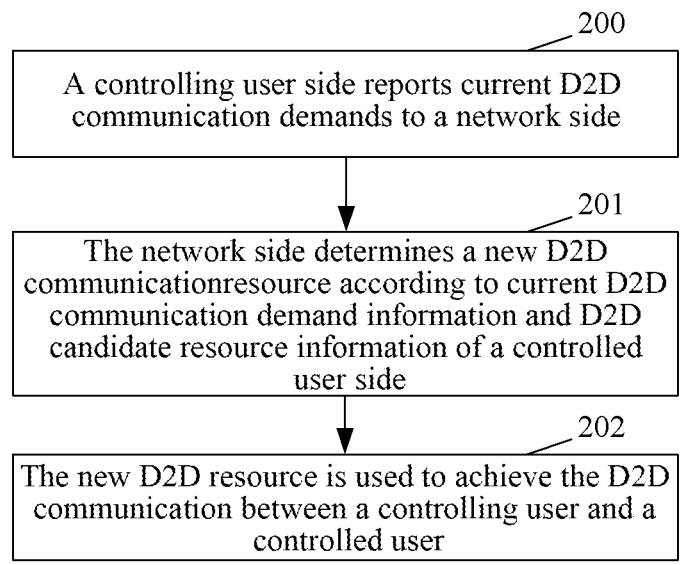
FIG. 2 is a flow chart of a method for achieving the D2D communication in the embodiment of the present document.

FIG. 2 is a flow chart of a method for achieving the D2D communication in the embodiment of the present document, and as shown in FIG. 2, the following steps are included.

In step 200, a controlling user side requests a network side for coordinating the current D2D communication resources.

Before the step, it also includes: at the controlling user side, a base station of a cell in where a controlling user is located allocates channel resources occupied by the D2D communication, and a channel resource shortage exists, for example, there are no spare channel resources or no appropriate shared channel resources and so on, that is to say, at the controlling user side, a case that a handover from the D2D communication to the cellular network communication will be caused if D2D resource coordination is not performed occurs. A specific implementation belongs to a conventional technical means of the skilled in the art, and it is not used to limit the protection scope of the present document, which will not be repeated here.

The base station of the cell where the controlling user is located requests the network side for coordinating the current D2D communication resources, and conditions for requesting the D2D resource coordination may include: a mutual interference between other users within the cell and the D2D user, so that resource occupied by the D2D communication cannot be used, and/or an expense settlement problem of the D2D controlling user and so on.

In the request for wishing to coordinate the resource of the current D2D communication, D2D communication demand information for achieving the current D2D communication including information of a controlled user of the current D2D communication and traffic and Quality of Service (QoS) of the D2D communication, etc. will be carried.

In step 201, the network side determines a new D2D communication resource according to the current D2D communication demand information and D2D candidate resource information of a controlled user side.

In the step, the D2D candidate resource information of the controlled user side at least includes: a candidate resource that is spare and available for D2D multiplexing.

The D2D candidate resource information from a base station of a cell where the controlled user is located can be fed back to the network side in a triggering way, or be fed back to the network side in a periodic way. When the triggering way is used, triggering can be started when the network side receives the request for coordinating the current D2D communication resources from the controlling user side, and the base station of the cell where the controlled user is located is informed to perform feedback; when the periodic way is used, the base station of the cell where the controlled user is located performs feedback to the network side periodically, and the network side will continuously refresh the D2D candidate resource information that is newly fed back.

Determining the new D2D communication resource in the step specifically includes that:

it is to judge whether a D2D candidate resource of the controlled user side meets the current D2D communication demands, and if it is judged that the D2D candidate resource meets the current D2D communication demands, it is to determine the D2D candidate resource as a new D2D communication resource. It should be noted that, with regard to a D2D cluster, that is, in a case that a cluster head in the D2D cluster is the controlling user and other cluster members within the cluster are the controlled users, the number of the D2D candidate resources fed back to the network side is two or more than two, if judging that multiple D2D candidate resources all meet the current D2D communication demands, an optimal D2D candidate resource therein is selected as a new D2D communication resource. Here, how to judge and select specifically belongs to a conventional technical means of the skilled in the art, and it is not used to limit the protection scope of the present document, which will not be repeated here.

If the D2D candidate resources of the controlled user side all cannot meet the current D2D communication demands, handover processing can be performed on the current D2D communication in the existing way.

In step 202, the new D2D resource is used to achieve the D2D communication between the controlling user and the controlled user.

Before the step, it also includes that: the network side feeds back information of a selected D2D candidate resource meeting the current D2D communication demands to the controlled user side, and informs the controlling user side of the information of the selected D2D candidate resource meeting the current D2D communication demands, specifically, the network side performs notification or feedback via the base station of the cell where the controlling user is located or the base station of the cell where the controlled user is located respectively. Wherein, a specific implementation of the network side sending the message to the users belongs to the related art, and it can be implemented by using the existing message, which will not be repeated here. In the embodiments of the present document, it is stressed that, when a channel resource shortage occurs at the controlling user side, the D2D communication also can be performed by using the channel resources of the controlled user side through negotiation.

The step 202 specifically includes that: the base station of the cell where the controlling user is located and the base station of the cell where the controlled user is located respectively control the controlling user and the controlled user to perform resource handover according to the new D2D communication resource, and hand over to the selected D2D candidate resource to perform D2D communication. A resource handover process therein belongs to the publically known in the art, and a specific implementation method does not belong to the protection scope of the present document, and it is also not used to limit the protection scope of the present document, which will not be repeated here.

Correspondingly, since the current resources are resources of the controlled user side, the original controlling user becomes a controlled user, and the original controlled user becomes a controlling user.

As can be seen from the method for achieving the D2D communication in the embodiment of the present document, when a channel resource shortage occurs at the controlling user side, firstly it is to negotiate and use channel resources of the controlled user side to perform D2D communication. Therefore, it ensures that the channel resource shortage of the wireless communication system can be fully relieved through the D2D communication, which avoids the D2D users performing handover between the D2D communication and the cellular network communication as far as possible, thereby reducing the burden of the cellular network, and improving the resource utilization rate of the cellular network.

Figure 3:
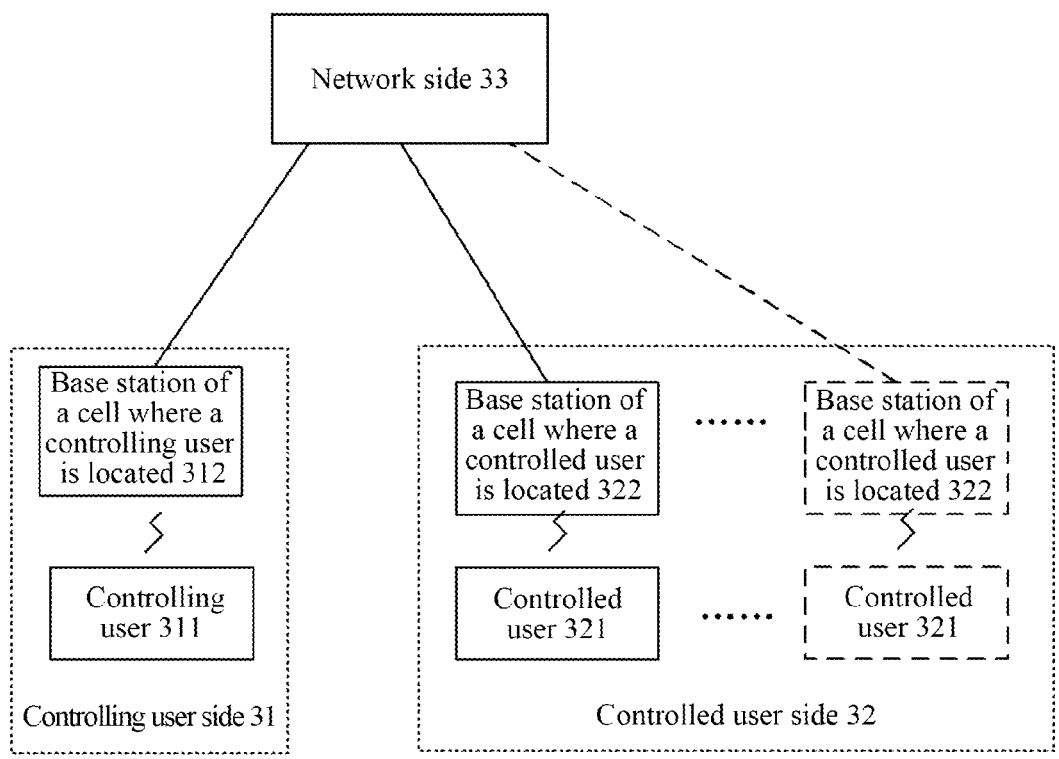
FIG. 3 is a composition block diagram of a system for achieving the D2D communication in the embodiment of the present document.

FIG. 3 is a composition block diagram of a system for achieving the D2D communication in the embodiment of the present document, and as shown in FIG. 3, a controlling user side 31, a controlled user side 32 and a network side 33 are at least included, wherein, the controlling user side 31 is configured to: send a request for coordinating the current D2D communication resources to the network side, receive a new D2D communication resource from the network side, and use the new D2D resource to achieve the D2D communication.

The network side 33 is configured to: receive the request for coordinating the current D2D communication resources from the controlling user side; receive D2D candidate resource information from the controlled user side; determine a new D2D communication resource according to the current D2D communication demand information and the D2D candidate resource information of the controlled user side; and distribute the new D2D communication resource determined to the controlling user side and the controlled user side.

The controlled user side 32 is configured to: report the D2D candidate resource information to the network side; receive the new D2D communication resource from the network side, and use the new D2D resource to achieve the D2D communication.

Wherein, the network side can communicate with base stations of cells where D2D communication users belonging to different operators are located, and it also can communicate with a core network to which each base station belongs, thereby acquiring registration information of the D2D communication users; in addition, when the controlling user side and the controlled user side respectively belong to different operators, that is, with regard to the D2D users belonging to different operators, the network side can be a device configured separately or be implemented with a core network; and when the controlling user side and the controlled user side belong to the same operator, that is, with regard to the D2D users belonging to the same operator, the network side also can be a base station with an interface (X2 interface) interconnecting base stations.

In FIG. 3, the controlling user side at least includes a controlling user 311 and a base station 312 of a cell where the controlling user is located; the controlled user side at least includes a controlled user 321 and a base station 322 of a cell where the controlled user is located; wherein, the base station 312 of the cell where the controlling user is located is configured to: allocate channel resources occupied by the D2D communication of the controlling user, when a channel resource shortage exists, send the request for coordinating the current D2D communication resources to the network side; and receive the new D2D communication resource from the network side to distribute to the controlling user;

the controlling user 311 is configured to: use the new D2D communication resource to perform D2D communication with the controlled user; and the network side 33 is configured to: receive the request for coordinating the current D2D communication resources from the base station of the cell where the controlling user is located, and receive the D2D candidate resource information from the base station of the cell where the controlled user is located; judge whether the D2D candidate resource meets the current D2D communication demands, and if the D2D candidate resource meets the current D2D communication demands, determine the D2D candidate resource as the new D2D communication resource; and distribute the new D2D communication resource determined to the base station of the cell where the controlling user is located and the base station of the cell where the controlled user is located.

The base station 322 of the cell where the controlled user is located is configured to: feed the D2D candidate resource information back to the network side; and receive the new D2D communication resource from the network side to distribute to the controlled user; wherein, the D2D candidate resource information is fed back in a triggering way or a periodic way;

the controlled user 321 is configured to: use the new D2D communication resource to perform D2D communication with the controlling user.

Wherein, the network side 33 is also configured to: when it is judged that the D2D candidate resource cannot meet the current D2D communication demands, perform handover processing on the current D2D communication in the existing way.

The number of the controlled users 321 in FIG. 3 can be one or more than one, when the number of the controlled users 321 is two or more than two, the number of the D2D candidate resources fed back to the network side 33 is two or more than two; and when judging that the number of D2D candidate resources meeting the current D2D communication demands is two or more than two, the new D2D communication resource is an optimal D2D candidate resource therein.

The above description is only the preferred embodiments of the present document, which is not used to limit the protection scope of the present document. All the modifications, equivalent substitutions, and improvements, etc. made within the spirit and principle of the present document shall fall into the protection scope of the present document.

INDUSTRIAL APPLICABILITY

In the embodiments of the present document, when a channel resource shortage occurs at the controlling user side, firstly it is to negotiate and use channel resources of the controlled user side to perform D2D communication. Therefore, it ensures that the channel resource shortage of the wireless communication system can be fully relieved through the D2D communication, which avoids the D2D users performing handover between the D2D communication and the cellular network communication as far as possible, thereby reducing the burden of the cellular network, and improving the resource utilization rate of the cellular network.

What is claimed is:

1. A method for achieving device-to-device D2D communication, comprising: a controlling user side requesting a network side for coordinating current D2D communication resources;

the network side determining a new D2D communication resource according to current D2D communication demand information and D2D candidate resource information of a controlled user side; and using the new D2D communication resource to achieve the D2D communication between a controlling user and a controlled user; wherein the following is further comprised before the method: a base station of a cell where the controlling user is located at the controlling user side allocating channel resources occupied by the D2D communication, wherein a channel resource shortage exists; and the channel resource shortage comprises: a mutual interference between other users within the cell where the controlling user is located and the controlling user, and/or expense settlement of the controlling user;

the request for coordinating the current D2D communication resources carries demand information for achieving the current D2D communication, comprising: information of the controlled user in the current D2D communication, and traffic and quality of service of the D2D communication;

the D2D candidate resource information at least comprises: a candidate resource that is spare and available for D2D multiplexing;

said determining the new D2D communication resource comprises:

judging whether the D2D candidate resource meets current D2D communication demands, and if the D2D candidate resource meets the current D2D communication demands, determining the D2D candidate resource as the new D2D communication resource.

2. The method according to claim 1, further comprises: if judging that the D2D candidate resource cannot meet the current D2D communication demands, performing handover processing on the current D2D communication in an existing way.

3. The method according to claim 1, wherein, when a number of the D2D candidate resources is two or more than two, the method further comprises:

if judging that there exist a plurality of D2D candidate resources which all meet the current D2D communication demands, selecting an optimal D2D candidate resource therein as the new D2D communication resource.

4. The method according to claim 1, wherein before using the new D2D resource to achieve the D2D communication, the method further comprises:

the network side feeding back information of a selected D2D candidate resource meeting the current D2D communication demands to the controlled user side, and informing the controlling user side of the information of the selected D2D candidate resource meeting the current D2D communication demands.

5. The method according to claim 4, wherein the method further comprises: the network side distributing corresponding initial power to the controlling user side and the controlled user side.

6. The method according to claim 4, wherein, using the new D2D resource to achieve the D2D communication comprises:

the base station of the cell where the controlling user is located and a base station of a cell where the controlled user is located respectively controlling the controlling user and the controlled user to perform resource handover according to the new D2D communication resource, and handing over to the selected D2D candidate resource to perform D2D communication.

7. A system for achieving device-to-device D2D communication, comprising: a controlling user side, a controlled user side and a network side, wherein, the controlling user side is configured to: send a request for coordinating current D2D communication resources to the network side, receive a new D2D communication resource from the network side, and use the new D2D communication resource to achieve the D2D communication;

the network side is configured to: receive the request for coordinating the current D2D communication resources from the controlling user side; receive D2D candidate resource information from the controlled user side; determine a new D2D communication resource according to current D2D communication demand information and the D2D candidate resource information of the controlled user side; and distribute the new D2D communication resource determined to the controlling user side and the controlled user side; and the controlled user side is configured to: report the D2D candidate resource information to the network side; receive the new D2D communication resource from the network side, and use the new D2D resource to achieve the D2D communication; wherein the controlling user side at least comprises a controlling user and a base station of a cell where the controlling user is located; the controlled user side at least comprises a controlled user and a base station of a cell where the controlled user is located; wherein, the base station of the cell where the controlling user is located is configured to: allocate channel resources occupied by the D2D communication of the controlling user, when a channel resource shortage exists, send the request for coordinating the current D2D communication resources to the network side; and receive the new D2D communication resource from the network side to distribute to the controlling user;

the controlling user is configured to: use the new D2D communication resource to perform D2D communication with the controlled user;

the network side is configured to: receive the request for coordinating the current D2D communication resources from the base station of the cell where the controlling user is located, and receive the D2D candidate resource information from the base station of the cell where the controlled user is located judge whether the D2D candidate resource meets current D2D communication demands, and if the D2D candidate resource meets the current D2D communication demands, determine the D2D candidate resource as the new D2D communication resource; and distribute the new D2D communication resource determined to the base station of the cell where the controlling user is located and the base station of the cell where the controlled user is located;

the base station of the cell where the controlled user is located is configured to: feed the D2D candidate resource information back to the network side; and receive the new D2D communication resource from the network side to distribute to the controlled user; and the controlled user is configured to: use the new D2D communication resource to perform D2D communication with the controlling user.

8. The system according to claim 7, wherein, the network side is further configured to: communicate with base stations of cells where D2D communication users belonging to different operators are located, and communicate with a core network to which each base station belongs.

9. The system according to claim 8, wherein, if the controlling user side and the controlled user side belong to a same operator, the network side is a base station with an X2 interface.

10. The system according to claim 9, wherein, the controlling user side at least comprises a controlling user and a base station of a cell where the controlling user is located;

the controlled user side at least comprises a controlled user and a base station of a cell where the controlled user is located; wherein, the base station of the cell where the controlling user is located is configured to: allocate channel resources occupied by the D2D communication of the controlling user, when a channel resource shortage exists, send the request for coordinating the current D2D communication resources to the network side; and receive the new D2D communication resource from the network side to distribute to the controlling user;

the controlling user is configured to: use the new D2D communication resource to perform D2D communication with the controlled user;

the network side is configured to: receive the request for coordinating the current D2D communication resources from the base station of the cell where the controlling user is located, and receive the D2D candidate resource information from the base station of the cell where the controlled user is located; judge whether the D2D candidate resource meets current D2D communication demands, and if the D2D candidate resource meets the current D2D communication demands, determine the D2D candidate resource as the new D2D communication resource; and distribute the new D2D communication resource determined to the base station of the cell where the controlling user is located and the base station of the cell where the controlled user is located;

the base station of the cell where the controlled user is located is configured to: feed the D2D candidate resource information back to the network side; and receive the new D2D communication resource from the network side to distribute to the controlled user; and the controlled user is configured to: use the new D2D communication resource to perform D2D communication with the controlling user.

11. The system according to claim 7, wherein, if the controlling user side and the controlled user side respectively belong to different operators, the network side is a device configured separately or is implemented with a core network.

12. The system according to claim 11, wherein, the controlling user side at least comprises a controlling user and a base station of a cell where the controlling user is located; the controlled user side at least comprises a controlled user and a base station of a cell where the controlled user is located; wherein, the base station of the cell where the controlling user is located is configured to: allocate channel resources occupied by the D2D communication of the controlling user, when a channel resource shortage exists, send the request for coordinating the current D2D communication resources to the network side; and receive the new D2D communication resource from the network side to distribute to the controlling user;

the controlling user is configured to: use the new D2D communication resource to perform D2D communication with the controlled user;

the network side is configured to: receive the request for coordinating the current D2D communication resources from the base station of the cell where the controlling user is located, and receive the D2D candidate resource information from the base station of the cell where the controlled user is located; judge whether the D2D candidate resource meets current D2D communication demands, and if the D2D candidate resource meets the current D2D communication demands, determine the D2D candidate resource as the new D2D communication resource; and distribute the new D2D communication resource determined to the base station of the cell where the controlling user is located and the base station of the cell where the controlled user is located;

the base station of the cell where the controlled user is located is configured to: feed the D2D candidate resource information back to the network side; and receive the new D2D communication resource from the network side to distribute to the controlled user; and the controlled user is configured to: use the new D2D communication resource to perform D2D communication with the controlling user.

13. The system according to claim 7, wherein, the D2D candidate resource information is fed back in a triggering way or a periodic way.

14. The system according to claim 7, wherein,
the network side is further configured to: when judging that the D2D candidate resource does not meet the current D2D communication demands, perform handover processing on the current D2D communication in an existing way.

15. The system according to claim 14, wherein, a number of the controlled users is one or more than one.

16. The system according to claim 15, wherein, when the number of the controlled users is two or more than two, a number of the D2D candidate resources is two or more than two; and when judging that the number of D2D candidate resources meeting the current D2D communication demands is two or more than two, the new D2D communication resource is an optimal D2D candidate resource therein.

* * * * *